(No Model.) 3 Sheets—Sheet 2.

J. E. BERING.
CHECK ROW CORN PLANTER.

No. 379,850. Patented Mar. 20, 1888.

ATTEST
L. Williams.
H. M. Richards.

INVENTOR
Jas. Edwd Bering,
By W. B. Richards,
Atty.

(No Model.) 3 Sheets—Sheet 3.

J. E. BERING.

CHECK ROW CORN PLANTER.

No. 379,850. Patented Mar. 20, 1888.

ATTEST:
L. Williams.
H. M. Richards.

INVENTOR
Jas. Edwd. Bering,
By W. D. Richards,
Atty.

UNITED STATES PATENT OFFICE.

JAMES EDWARD BERING, OF DECATUR, ILLINOIS, ASSIGNOR TO THE CHAMBERS, BERING, QUINLAN COMPANY, OF SAME PLACE.

CHECK-ROW CORN-PLANTER.

SPECIFICATION forming part of Letters Patent No. 379,850, dated March 20, 1888.

Application filed January 3, 1888. Serial No. 259,572. (No model.)

*To all whom it may concern:*

Be it known that I, JAMES EDWARD BERING, a citizen of the United States, residing at Decatur, in the county of Macon and State of Illinois, have invented certain new and useful Improvements in Check-Row Corn-Planters, of which the following is a specification.

This invention relates to improvements in check-row corn-planters of that class shown and described in the Letters Patent granted to John Kaylor, April 20, 1886, No. 340,511; and the object of the present invention is to insure the more certain dropping of the seed in a mass from the seed-box, and to insure their not dropping from the seed-box, or any portion of them, in such manner as to reach the discharge-valve at the lower end of the seed-tube while open.

To the end of attaining these obects this invention consists in the use of an auxiliary valve located immediately below the ordinary seed measuring and discharging valve in the seed-box, adapted to receive the seed from said ordinary valve and to drop it in a mass, without dribbling, and actuated by the check-rower mechanism to discharge its contained seed at such times that the charges will reach the lower or discharge valve while it is closed.

The accompanying drawings illustrate my invention, and so much of the Kaylor patented planter as is necessary to show its connection therewith and mode of operation.

Figure 1:
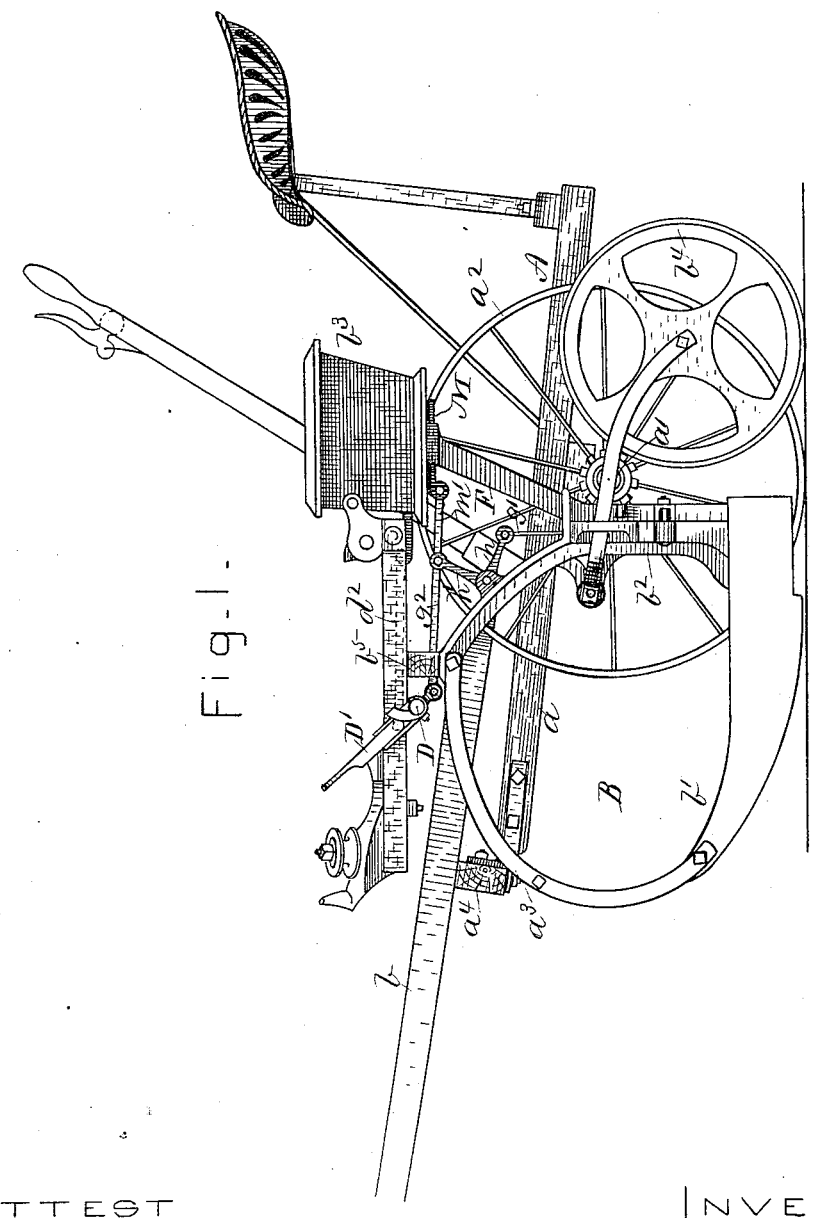
Figure 2:
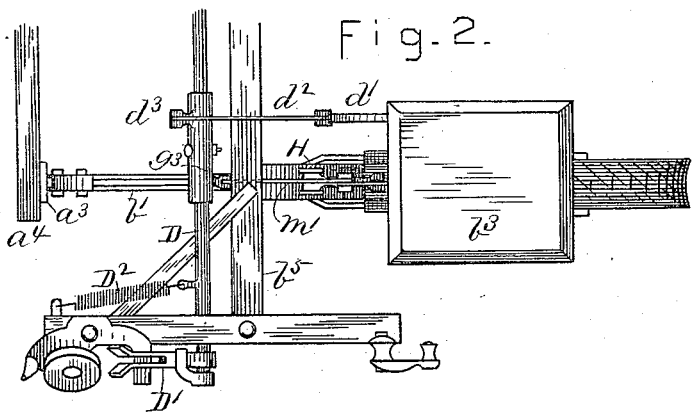
Figure 3:
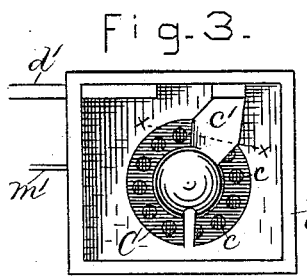
Figure 4:
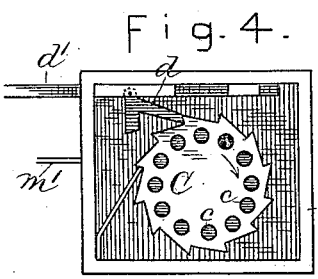
Figure 5:
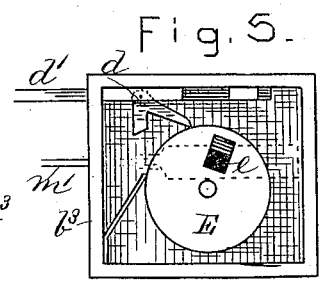
Figure 6:
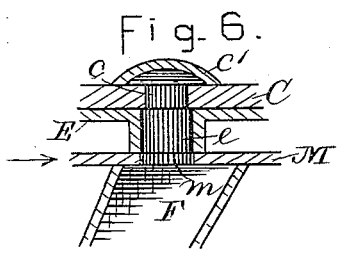
Figure 7:
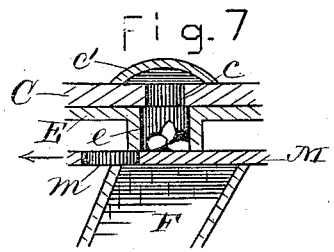
Figure 8:
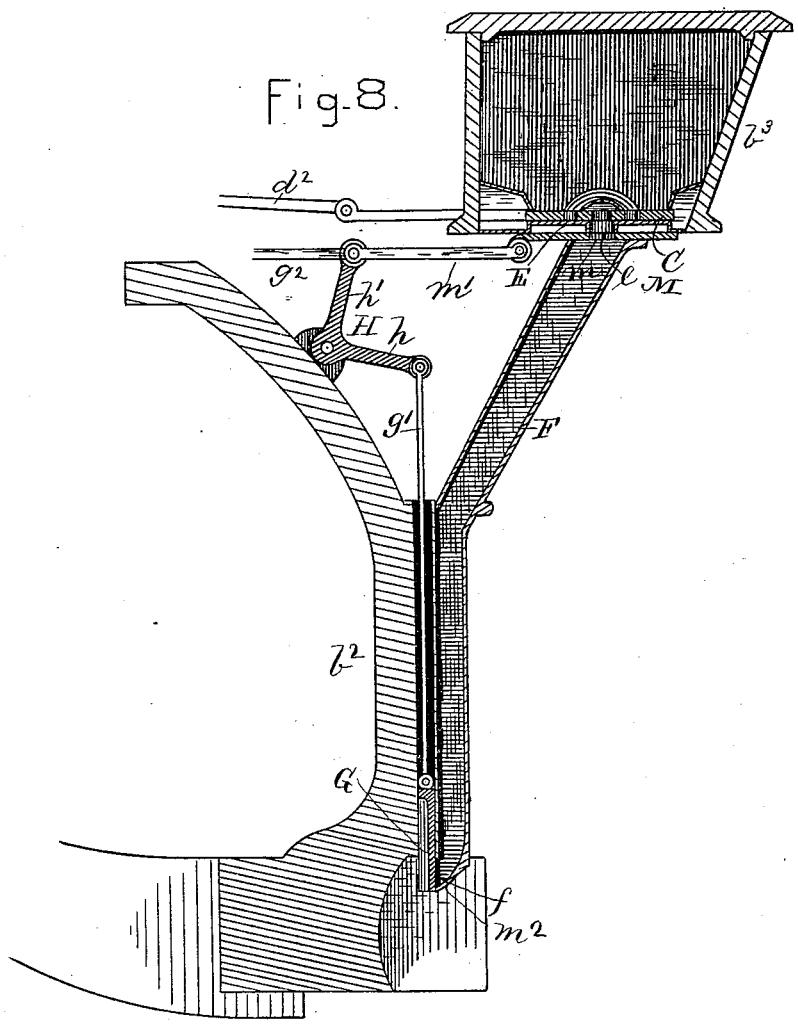

In said drawings, Figure 1 is a side elevation of the planter, partly showing my invention; Fig. 2, a top plan of the seed-box, check-row rock-shaft, seed-slide or valve actuating-rods, and other accessory parts; Fig. 3, a top plan of a seed-box with its cover removed therefrom; Fig. 4, a top plan of a seed-box with the cover and cap-plate removed therefrom; Fig 5, a top plan of a seed-box with cover, cap-plate, and seed-cup disk, or upper valve removed therefrom. Figs. 6 and 7 are enlarged sectional elevations in the line $xx$ in Fig. 3, showing the auxiliary valve in different parts of its movement. Fig. 8 is an enlarged central sectional elevation of the seed-box and its dropping-valves, the seed-tube, and other accessory parts.

The front and rear frames, A and B, respectively, of the planter shown in these drawings are substantially the same as the planter shown in said Kaylor patent, and need not be herein further described than to point out that the frame-bars $a$ of the rear frame are supported on the axle $a'$ and wheels $a^2$, and are hinged at their front ends at $a^3$ to the bar $a^4$ of the front frame, and the front frame carries the tongue $b$, runners $b'$, seed-tubes $b^2$, seed-boxes $b^3$, covering and gage wheels $b^4$, check-row bar $b^5$, and all other of the seed-dropping devices and their actuating mechanism, (except the tappet check-row line, which is not shown,) so that the movements of the front and rear frames relatively to each other do not in any manner effect the relation of the seed-dropping devices and their actuating mechanism to each other.

The seed measuring and discharging valve C, with its seed-cups $c$, is the same, substantially, as the same valve in said Kaylor patent, and is operated in the same manner by a pawl, $d$, slide $d'$, and link-rod $d^2$, extending to an arm, $d^3$, which projects upwardly from the rock-shaft D in such manner that at each swing or vibration to the rear given a forked lever, D', on the rock-shaft D, by contact with a tappet on the check-row line, a movement in the same direction, or toward the seed-box, will be given the pawl $d$, and a partial rotation be thereby given to the seed-cup disk or valve C to bring one of its seed-cups $c$ beneath the cut-off $c'$, to discharge its contained seed into the enlarged receiving cup or opening $e$ in the bottom plate, E, of the seed-box.

The seed-duct F terminates in a discharge-opening, $f$, which is opened by the upward movement of a discharge-valve, G, and closed by the downward movement of said valve. This valve G is actuated by a bell-crank lever, H, to one arm, $h$, of which the stem $g'$ of valve G is connected, while its other arm, $h'$, is connected by a link-rod, $g^2$, with an arm, $g^3$, which projects downwardly from the rock-shaft D, or in an opposite direction to the arm $d^3$. This valve G and its actuating mechanism are the same as shown in aforesaid Kaylor patent.

I will now proceed to describe my auxiliary valve M and its relation to and connection with the hereinbefore-described devices. This valve M is fitted to slide in suitable ways beneath the seed-box bottom E, and has an opening, m, through it corresponding in size with the opening e in the seed-box bottom. A link-rod, m', is pivotally connected at one end to the valve M, and in a similar manner at its other end to the same arm h' of the bell-crank lever H as is connected the link-rod g².

When the rock-shaft D is given a movement, as hereinbefore described, by contact of a fork thereon with a tappet on the check-row line, and the valve C is thereby moved, so as to discharge the contents of one of its cups c, the auxiliary valve M will by the same movement of the rock-shaft be drawn in a direction shown by the arrow at Fig. 7, and into a position to close the bottom of and hold the seed in the opening e in the seed-box bottom E, as shown at same figure. As soon as the tappet escapes from the forked lever it and the rock-shaft will be restored to their normal positions by a backward or return movement given them by the spring D², which return movement will draw back the pawl d, ready for another action at the proper time on the valve C, and will also thrust the valve M forward in the direction shown by the arrow at Fig. 6, and into the position shown at same figure and also at Fig. 8, with its opening m registering or coinciding with the opening e in the bottom plate, E, to permit the seed contained in opening e to drop through the seed-tube b² to the discharge-valve G, which was closed for its reception by the same movement of the rock-shaft which slid the valve M, as last described. The discharge-valve G will again be opened to discharge the seed now contained on the inclined shelf m² to one side of said valve by the next movement of the rock-shaft, given it by a tappet, as hereinbefore described, and which again closes the discharge to the opening e, and measures and drops a charge of seed by another movement of the valve C, as already described.

When the seed is dropped from a seed-cup in a valve, C, it will often be wedged therein and dribbled into the seed-tube, so as not to reach the discharge-valve until it is partly opened and allows of its escape at a wrong time and place in the row of deposits of seed. This and other objections are overcome by the use of an auxiliary valve, M, and a receiving-pocket, e, in which the seed is loosely held until a proper time and then dropped in a mass together into the seed-tube.

What I claim as new, and desire to secure by Letters Patent, is—

1. In a check-row corn-planter, in combination, a seed measuring and discharging valve in the seed-box actuated periodically by a rock-shaft, D, a discharge-valve in the seed-tube, and an auxiliary valve beneath a seed-receiving opening in a plate beneath the seed-measuring valve, said auxiliary valve and lower discharge-valve actuated by the said rock-shaft, and mechanism connecting them therewith, substantially as described, and for the purpose specified.

2. In a corn-planter, in combination with a seed-measuring valve in the seed-box and a discharge-valve at the bottom of the seed-tube, an auxiliary valve located beneath a seed-holding cup or opening beneath said seed-measuring valve, substantially as and for the purpose specified.

3. In combination, valve C, plate E, with opening e, valve M, with opening m, seed-tube b², and discharge-valve G, substantially as and for the purpose specified.

4. In combination, seed-cup valve C, actuated, as described, by rock-shaft D, opening e, valve M, with opening m, discharge-valve G, and bell-crank lever H, connected with the rock-shaft, with the valve M, and with the discharge-valve G, substantially as and for the purpose specified.

5. In combination with a seed measuring and discharging valve in the seed-box, a valve located closely beneath the seed-box and adapted to momentarily retain the seed and drop them in a mass to the lower discharging-valve, substantially as and for the purpose specified.

In testimony whereof I affix my signature in presence of two witnesses.

JAMES EDWARD BERING.

Witnesses:
  R. J. SIMPSON,
  WM. B. CHAMBERS.